(12) United States Patent
Kroupenkine et al.

(10) Patent No.: US 6,545,816 B1
(45) Date of Patent: Apr. 8, 2003

(54) PHOTO-TUNABLE LIQUID MICROLENS

(75) Inventors: Timofei N. Kroupenkine, Piscataway, NJ (US); Shu Yang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/046,467

(22) Filed: Oct. 19, 2001

(51) Int. Cl.[7] .................................................. G02B 3/12
(52) U.S. Cl. ........................ 359/665; 359/666; 359/299
(58) Field of Search .................................. 359/666, 665, 359/299

(56) References Cited

U.S. PATENT DOCUMENTS

| | | | |
|---|---|---|---|
| 4,010,321 A | 3/1977 | Kohashi | 348/774 |
| 4,030,813 A | 6/1977 | Kohashi et al. | 359/245 |
| 4,118,270 A | 10/1978 | Pan et al. | 156/659 |
| 4,137,060 A | 1/1979 | Timmerman | 65/31 |
| 4,338,352 A | 7/1982 | Bear et al. | 427/8 |
| 4,406,732 A | 9/1983 | Kayoun | 156/626 |
| 4,653,847 A | 3/1987 | Berg et al. | 385/79 |
| 4,671,609 A | 6/1987 | Khoe et al. | 385/33 |
| 4,708,426 A | 11/1987 | Khoe | 385/43 |
| 4,867,521 A | 9/1989 | Mallinson | 385/34 |
| 4,948,214 A | 8/1990 | Hamblem | 359/654 |
| 5,412,746 A | 5/1995 | Rossberg et al. | 385/48 |
| 5,518,863 A | 5/1996 | Pawluczyk | 430/321 |
| 5,574,598 A | * 11/1996 | Koumura et al. | 359/666 |
| 6,014,259 A | 1/2000 | Wohlstaadter | 359/619 |
| 6,369,954 B1 | * 4/2002 | Berg et al. | 359/666 |

FOREIGN PATENT DOCUMENTS

WO    WO 97/40385 A    10/1997

OTHER PUBLICATIONS

Schilling, Andreas et al., Surface Profiles of Reflow Microlens Under the Influence of Surface Tension and Gravity, *Opt. Eng.* 39(8) pp. 2171–2176, Society of Photo–Optical Instrumentation Engineers, Aug. 2000.

Danzebrink, R. et al., "Deposition of Micropatterned Coating Using an Ink–Jet Technique," *Thin Solid Films* 351, pp. 115–118, Elsevier Science S.A. (1999).

Feng, Chuan Liang et al., "Reversible Wettability of Photoreponsive Flourine–Containing Azobenzene Polymer in Langmuir–Blodgett Films," *Langmuir* vol. 17, No. 15, 2001, pp. 4593–4597, American Chemical Society, published on Web Jun. 22, 2001.

Ichimura, Kunihiro et al., "Light–Driven Motion of Liquids on a Photoresponsive Surface," www.sciencemag.org, Science, vol. 288, Jun. 2, 2000, pp. 1624–1626.

Commander, L.G. et al., "Variable Focal Length Microlenses," *Optics Communications* 177 (2000), Apr. 15, 2000, pp. 157–170.

* cited by examiner

*Primary Examiner*—Georgia Epps
*Assistant Examiner*—M. Hasan
(74) *Attorney, Agent, or Firm*—Duane Morris, LLP

(57) ABSTRACT

An apparatus comprising a tunable liquid microlens that includes a transparent supporting layer and a transparent photoresponsive layer disposed on a first surface of the supporting layer. A droplet of a transparent liquid is disposed on the photoresponsive layer. The photoresponsive layer separates the supporting layer and the droplet. At least a portion of the photoresponsive layer that contacts the droplet may be selectively irradiated by at least one light source such that a contact angle between the droplet and the photoresponsive layer may be varied and the droplet may be repositioned along the photoresponsive layer. In this manner, at least one of a focal length and a lateral position of a focal spot of the microlens may be adjusted directly by irradiation with a light beam.

33 Claims, 5 Drawing Sheets

PHOTO-TUNABLE LIQUID MICROLENS

CROSS REFERENCE TO RELATED APPLICATIONS

This application is related to U.S. patent application Ser. No. 09/884,605 to Timofei N. Kroupenkine and Shu Yang, filed Jun. 19, 2001, entitled "Tunable Liquid Microlens" and to U.S. patent application Ser. No. 09/951,637 to Timofei N. Kroupenkine and Shu Yang, filed Sep. 13, 2001, entitled "Tunable Liquid Microlens With Lubrication Assisted Electrowetting," the entirety of which are both hereby incorporated by reference herein.

FIELD OF THE INVENTION

The present invention relates to microlenses, and more particularly to liquid microlenses.

DESCRIPTION OF THE RELATED ART

Most tunable microlenses are either gradient index (GRIN) lenses with the refractive index controlled electrostatically or flexible polymeric lenses with the shape controlled mechanically. Both technologies have inherent limitations that impose severe restrictions on the performance of these existing tunable microlenses.

Tunable gradient index lenses have inherent limitations associated with the relatively small electro-optic coefficients found in the majority of electro-optic materials. This results in a small optical path modulation and, therefore, requires thick lenses or very high voltages to be employed. In addition, many electro-optic materials show a strong birefringence that causes polarization dependence of the microlens properties.

Mechanically adjustable flexible lenses typically have a substantially wider range of tunability than the gradient index lenses. However, they require external actuation devices, such as micropumps, to operate. Microintegration of such devices involves substantial problems, especially severe in the case where a two-dimensional array of tunable microlenses is required.

Attempts have also been made to use other technologies to produce tunable microlenses, such as liquid microlenses controlled by absorption and desorption of self-assembled monolayers (SAMs). Some of these attempts are described in U.S. Pat. No. 6,014,259 to Wohlstadter, issued Jan. 11, 2000, the entirety of which is hereby incorporated by reference herein. Microlenses utilizing absorption and desorption of self-assembled monolayers, however, also suffer from several problems, including severe limitations on material selection and strong hysteresis leading to the failure of the microlens to return to an original shape after a tuning voltage is disconnected. Additionally, none of the above-described microlenses allow for both lens position adjustment and focal length tuning.

A tunable liquid microlense that utilizes electrowetting-based tuning is described in Applicants' copending applications—U.S. patent application Ser. No. 09/884,605, filed Jun. 19, 2001, entitled "Tunable Liquid Microlens" and U.S. patent application Ser. No. 09/951,637, filed Sep. 13, 2001, entitled "Tunable Liquid Microlens With Lubrication Assisted Electrowetting." The tunable liquid microlense allows for both lens position adjustment and focal length tuning.

SUMMARY OF THE INVENTION

We have recognized that while the '605 and '637 applications provide exemplary electrowetting-based tunable liquid microlenses, there remains a need to provide a tunable liquid microlens that does not rely on electrowetting in order to tune the microlens. In particular, in certain applications it may be advantageous to have a microlens that can be tuned using irradiation by light. Such a microlens would allow for additional functionality when compared to an electrowetting controlled microlens. For example, self alignment of the microlens with the collimated light beam or a direct control of the microlens properties by the light beam intensity and/or wavelength may be achieved.

Therefore, we have developed in accordance with the principles of the invention a liquid microlens that is photo-tunable, i.e., responsive to a light source. Such a photo-tunable liquid microlens includes a transparent supporting layer and a transparent photoresponsive layer disposed on a first surface of the supporting layer. A droplet of a transparent liquid is disposed on the photoresponsive layer. The photoresponsive layer separates the supporting layer and the droplet. In accordance with an aspect of the invention, at least a portion of the photoresponsive layer that contacts the droplet may be selectively irradiated by at least one light source such that a contact angle between the droplet and the photoresponsive layer may be varied and the droplet may be repositioned along the photoresponsive layer. In this manner, at least one of a focal length and a lateral position of a focal spot of the microlens may be adjusted. Note that by "light," it is meant electromagnetic radiation, including, but not limited to, X-Rays, ultraviolet, visible, infrared, radiowave, and radar sources.

The photo-tunable liquid microlens allows for both lens position and focal length tuning. In addition, the ability to respond to light allows for (a) a self alignment of the microlens with a collimated light beam or (b) a direct control of the microlens properties by varying the light beam intensity and/or wavelength.

BRIEF DESCRIPTION OF THE DRAWINGS

The accompanying drawings illustrate preferred embodiments of the invention, as well as other information pertinent to the disclosure, in which.

It should be understood that the figures are included for illustrative purposes and are not drawn to scale.

DETAILED DESCRIPTION

Light driven motion of liquids on photoresponsive surfaces has been studied for microfluid devices for biochemical and genetic analysis, but not for microlens tuning. Experiments have shown that irradiating a photoresponsive surface with light having a requisite wavelength can be used to change the surface energy of the photoresponsive surface. In Ichimura, K. et al., "Light-driven Motion of Liquids on a Photoresponsive Surface," 288 Science 1624 (2000), an experiment is detailed where this phenomenon is used to change the contact angle between a liquid droplet and a photoresponsive surface and to relocate a liquid droplet along a photoresponsive surface. This experiment is illustrated in FIGS. 1A–1B.

Figure 1A:
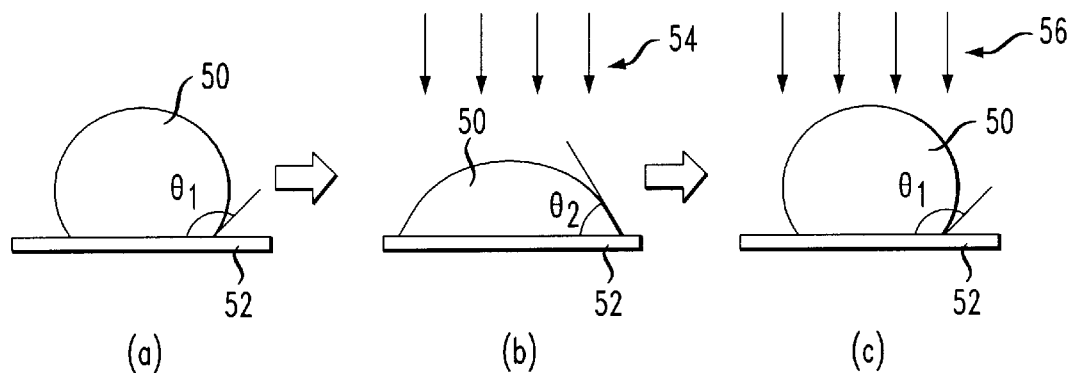
FIG. 1A–1B are diagrammatic illustrations of an experiment illustrating the effect of irradiating a photoresponsive surface with various light sources.

At instance "a" in FIG. 1A, a liquid droplet 50 is disposed on a photoresponsive surface 52. The droplet 50 forms an initial contact angle $\theta_1$ with the photoresponsive surface 52, as determined in part by the interfacial surface tension between the droplet 50 and the photoresponsive surface 52. At instance "b," the photoresponsive surface 52 is exposed to ultraviolet light 54. The chemical structure or conformation of the photoresponsive layer 52 changes in response to the ultraviolet light 54 and the surface energy of the layer 52 changes accordingly. The surface energy of the photoresponsive surface 52 increases in response to the ultraviolet light 54. Because the surface energy of the photoresponsive surface 52 changes, the interfacial surface tension between the droplet 50 and the photoresponsive layer 52 changes, and the droplet 50 spreads (i.e., the contact angle decreases from $\theta_1$ to $\theta_2$). Once ultraviolet light 54 is removed, the surface energy of the photoresponsive surface decreases and the contact angle returns to original contact angle $\theta_1$ from $\theta_2$. This retraction can be accelerated as shown in instance "c" by exposing photoresponsive surface 52 to a light source that produces light that causes the surface energy of the photoresponsive surface to decrease, such as blue light 56.

Figure 1B:
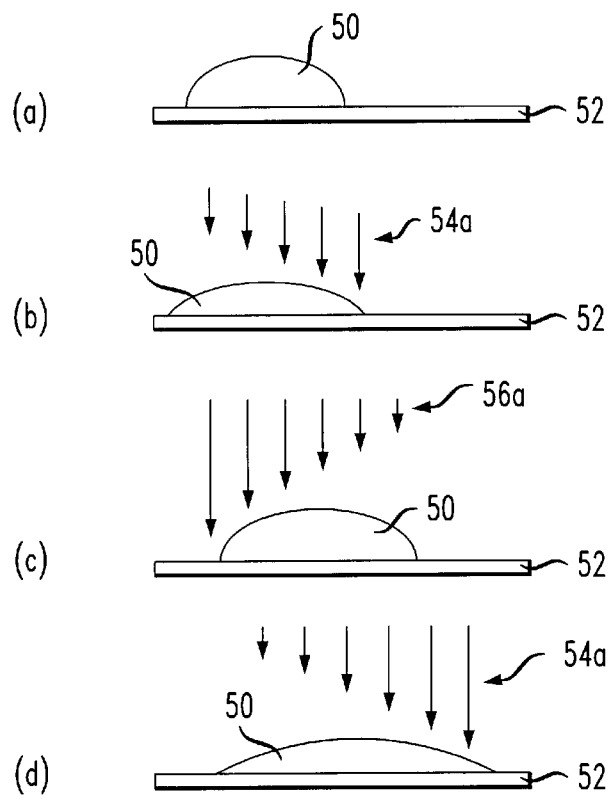

It has also been reported, as shown in FIG. 1B, that the direction of the photoirridation may be used to move the droplet 50. As shown at instance "a" of FIG. 1B, droplet 50 is again disposed on a photoresponsive surface 52. The photoresponsive surface 52 is exposed at instance "b"to ultraviolet light 54a, which has a relative gradient of intensity illustrated by the different lengths of the arrows representing light source 54a. At instance "c," photoresponsive layer 52 is exposed to blue light 56a having a gradient opposite that of ultraviolet light 54a. At instance"d," the photoresponsive layer 52 is again exposed to ultraviolet light source 54a. By gradiating the intensity of the light sources 54a, 56a, the relative increase or decrease in the surface energy of the photoresponsive layer 52 is not uniform and the droplet moves to, or away from as the case may be, the more intense light source.

As described, two light sources (e.g., sources 54a, 56a), each producing different wavelength light, are used to achieve this movement if contact angle hysteresis (the difference between an advancing contact angle and a retracting or receding contact angle) precludes any significant movement or if it is desired to accelerate the movement. Contact angle hysteresis depends on the history of the contact angle between the droplet and the surface. At each wavelength, the surface has a defined surface energy and a defined advancing and receding contact angles that are dependent on both the surface energy and the choice of the liquid. To ensure the motion of the droplet, the receding contact angle of the isomer of photoresponsive material prior to exposure or as exposed to light 56a having the second wavelength (e.g., visible light (436 nm)) should be greater than the advancing contact angle of the isomer exposed to light 54 having the first wavelength (e.g., UV light (365 nm)). Similar to electrowetting, if the hysteresis is too high, the droplet will not be able to return to its original shape when the light is removed.

Before the tunable liquid microlens of the present invention is described in detail, a general description of a liquid microlens is first provided.

Figure 2:
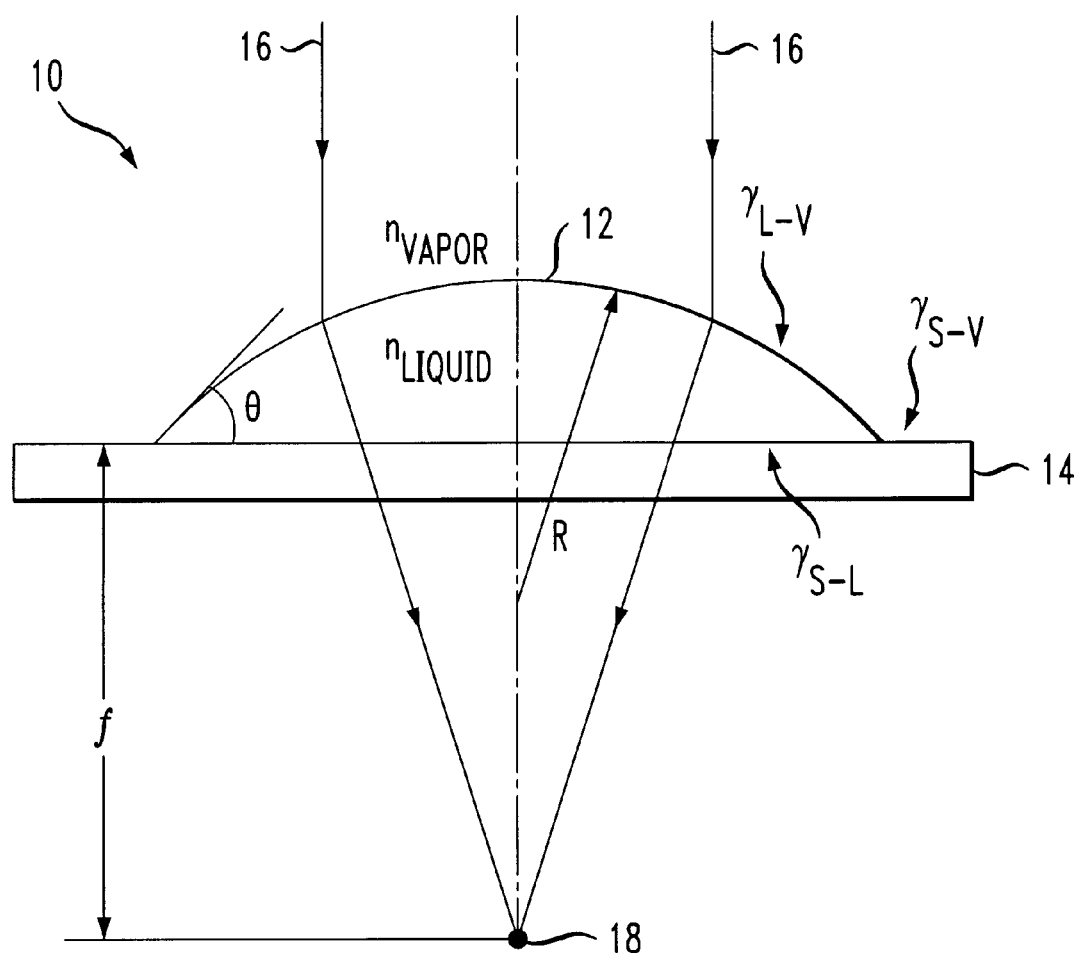
FIG. 2 is a diagrammatic representation of light waves passing through a liquid microlens.

Referring to FIG. 2, a liquid microlens 10 is shown. The microlens 10 includes a small droplet 12 of a transparent liquid, such as water, typically (but not necessarily) with a diameter from several micrometers to several millimeters. The droplet 12 is disposed on a transparent substrate 14. The liquid and substrate need only be transparent to light waves having a wavelength within a selected range. Light waves are illustrated by reference numeral 16. Light waves pass through liquid microlens 10 and focus at a focal point or focal spot (designated by reference numeral 18) in a focal plane that is a focal distance"f" from the contact plane between droplet 12 and substrate 14.

The contact angle"$\theta$" between the droplet 12 and the substrate 14 is determined by interfacial surface tensions (also called interfacial energy)"$\gamma$" generally measured in milli-Newtons per meter (mN/m). As used herein, $\gamma_{S-V}$ is the interfacial tension between the substrate and the air, gas or other liquid that surrounds the substrate 14, $\gamma_{L-V}$ is the interfacial tension between the droplet 12 and the air, gas or other liquid that surrounds the droplet 12, and $\gamma_{S-L}$ is the interfacial tension between the substrate 14 and the droplet 12. The contact angle $\theta$ may be determined from equation (1):

$$\cos\theta = \frac{\gamma_{S-V} - \gamma_{S-L}}{\gamma_{L-V}} \qquad \text{Equation (1)}$$

radius"R" in meters of the surface curvature of droplet 12 is determined by the contact angle $\theta$ and the droplet volume in cubic meters (m³) according to equation (2) as follows:

$$R^3 = \frac{3 \text{ Volume}}{\pi(1 - \cos\theta)(2 - \cos^2\theta - \cos\theta)} \qquad \text{Equation (2)}$$

The focal length in meters is a function of the radius R and the refractive indices"n" where $n_{liquid}$ is the refractive index of the droplet 12 and $n_{vapor}$ is the refractive index of the air, gas or other liquid that surrounds the droplet 12. The focal length f may be determined from equation (3):

$$f = \frac{R}{n_{Liquid} - n_{Vapor}} \qquad \text{Equation (3)}$$

The refractive index of the substrate is not important because of the parallel entry and exit planes for the light waves. The focal length of the microlens 10, therefore, is a function of the contact angle $\theta$.

Figure 3A:
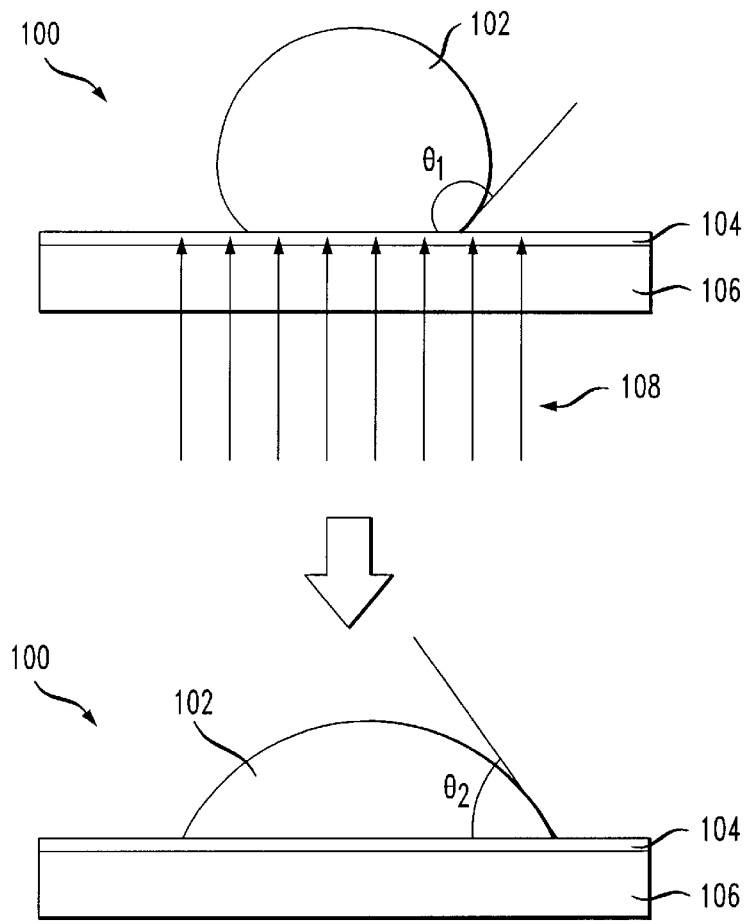
FIGS. 3A–3D are diagrammatic illustrations of a photo-tunable liquid microlens.
Figure 3B:
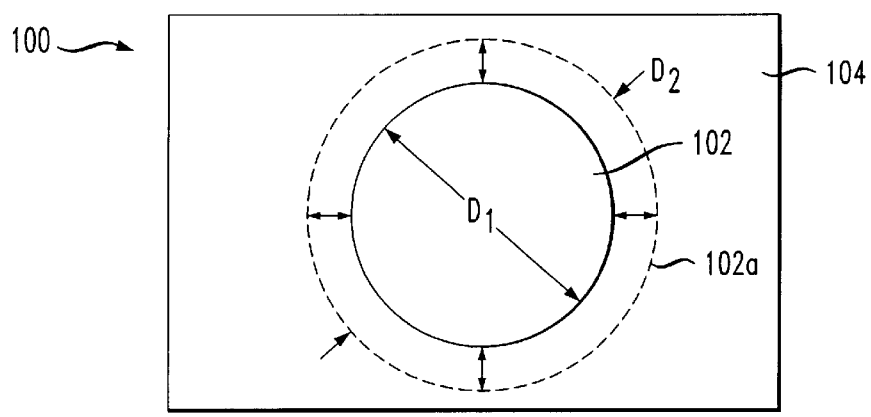

FIGS. 3A–3D illustrate a photo-tunable liquid microlens that is capable of varying both position and focal length as described hereafter. Referring first to FIG. 3A, a tunable liquid microlens 100 is shown that varies a contact angle $\theta$ in response to light irradiation. The tunable liquid microlens 100 includes a droplet of transparent liquid 102 disposed on a first surface of a transparent photoresponsive layer 104. The photoresponsive layer 104 is disposed on a first surface of a transparent supporting substrate 106, such as by a suitable deposition process. As described above, depending upon the relative initial interfacial tensions between the droplet 102 and the photoresponsive layer 104 (and any liquid or vapor that surrounds the droplet 102 and the photoresponsive layer 104), the droplet 102 forms an initial contact angle $\theta_1$ with the photoresponsive layer 104. At least one light source (not shown) is positioned to selectively irradiate with light (shown by arrows 108) at least a portion of the photoresponsive layer 104 that contacts the droplet 102. As shown in FIG. 3A, the light source is shown uniformly irradiating an area of the photoresponsive layer 104 which overlaps and includes all of the area of the photoresponsive layer 104 that contacts the droplet 102. This fairly uniform irradiation of this area with light 108 changes the surface energy of the photoresponsive layer 104 locally at this area and thus the interfacial tension between the droplet 102 and the photoresponsive layer 104 at this area. Consequently, the droplet 102 spreads as shown in FIG. 3A, i.e., the contact angle between the droplet 102 and the photoresponsive layer 104 decreases from $\theta_1$, to $\theta_2$. Note, the droplet 102 will not spread approximately beyond the area of photoresponsive layer 104 irradiated by light 108, i.e., beyond the area that realizes a change in surface energy due to exposure to light 108. Illustrated another way, as shown in the top plan view of FIG. 3B, the droplet 102 has a diameter that grows from diameter D1 to diameter D2 (shown by expanded droplet 102a) when the contact angle decreases from $\theta_1$ to $\theta_2$.

The uniform irradiation of the photoresponsive layer 104 as shown in FIG. 53A causes the droplet 102 to spread uniformly along the photoresponsive layer. Through this spreading, the contact angle $\theta$ between the droplet 102 and the photoresponsive layer 104 changes and the focal length of the microlens changes, as shown with equations (1) through (3) set forth above.

In order to force the droplet 102 to spread, light 108 must be of an appropriate wavelength such that it causes the chemical structure of the photoresponsive layer 104 to change appropriately, resulting in an increase in its surface energy. As described above, once the light source 108 is removed, the surface energy of the photoresponsive layer 104 eventually decreases until it reaches its original surface energy. As the surface energy decreases, the droplet 102 returns to its original shape (i.e., the original contact angle $\theta_1$, is restored). Also as described above, this retraction of the droplet 102 may be accelerated by irradiating the photoresponsive layer 104 with a light 108 having an appropriate wavelength so as to cause a chemical structure change that causes a decrease in the surface energy of the photoresponsive layer 104.

The amount of spreading of the droplet 102 may be controlled by the size of the area of the photoresponsive layer irradiated with light 108, the intensity of the light 108, the wavelength of the light 108, the surface energy of the material selected for the droplet 102, the photoresponsive functional group (described below) and other groups (e.g., fluorinated chains) incorporated in the photoresponsive layer 104, and the intrinsic surface energy and surface hysteresis of the photoresponsive layer 104. Of course, the wavelength of the irradiating light 108, whether it is used to increase the surface energy of the photoresponsive layer 104 (i.e., to spread the droplet 102) or to decrease the surface energy of the photoresponsive layer 104 (i.e., to retract the droplet 102), must be selected in accordance with the chemistry of the material that forms the photoresponsive layer 104. Below is a chart illustrating some examples of photoresponsive layers including functional groups that are appropriate for photoresponsive layer 104 and the wavelengths $\lambda$ of light to which they react.

| Photoresponsive Functional Groups | $\lambda_1$ (nm) | $\lambda_2$ (nm) |
| --- | --- | --- |
| Azobenzene | UV irradiation (350–365 nm) | Visible Light (417–450 nm) or Absence of Visible Light (dark) |
| Spiropyran | Visible Light (500–550 nm) | Absence of Visible Light (dark) |
| Pyrimidine | 280 nm | 240 nm |

In the above chart, $\lambda_1$ represents the wavelength of light that causes an increase in the surface energy of a material including the respective functional group, and thus a decrease in contact angle $\theta$, and $\lambda_2$ represents the wavelength of light (or absence of light as the case may be) that causes a decrease in the surface energy of a material including the respective functional group, and thus an increase in the contact angle $\theta$. One preferred structure for the photoresponsive layer is a thin film, ranging from several nanometers to several micrometers in thickness deposited on the supporting layer 106, such as by dip coating or spin coating. In one exemplary embodiment, the thin film is a monolayer including one of the above-referenced functional groups.

Another design consideration is selecting materials that will provide predefined values of contact angle $\theta$ and of contact angle hysteresis, as guided by the equations listed above. Contact angle hysteresis may be accounted for by utilizing a second light source as described above or controlled by utilizing deposition or coating techniques for disposing the photoresponsive layer 104 on supporting layer 106 that provide a highly uniform photoresponsive layer, thereby eliminating inhomogenieties that can cause localized differences in the interfacial tension between the droplet 102 and the photoresponsive layer 104.

Figure 3C:
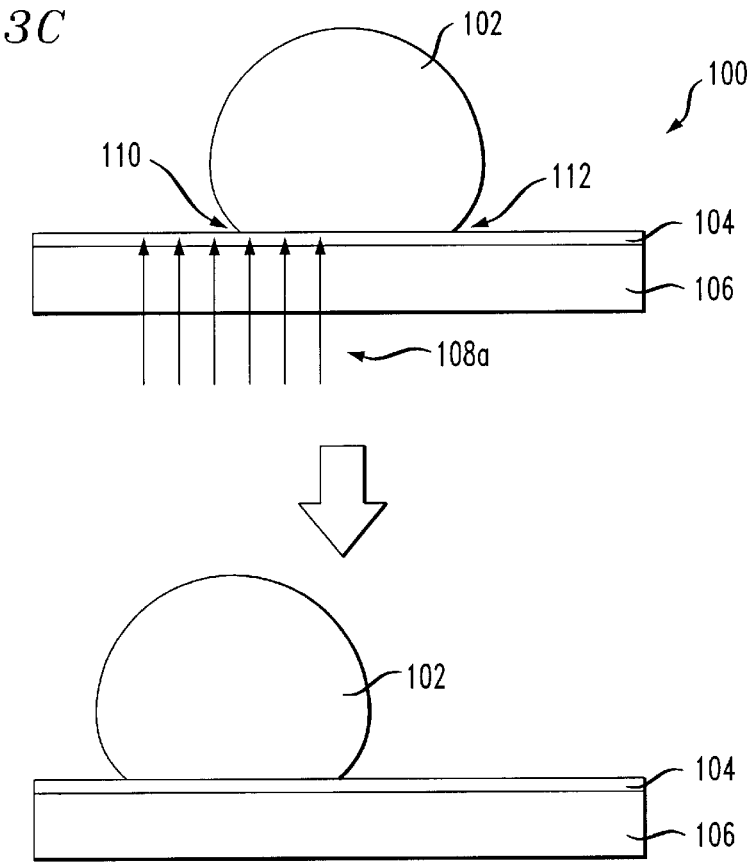
Figure 3D:
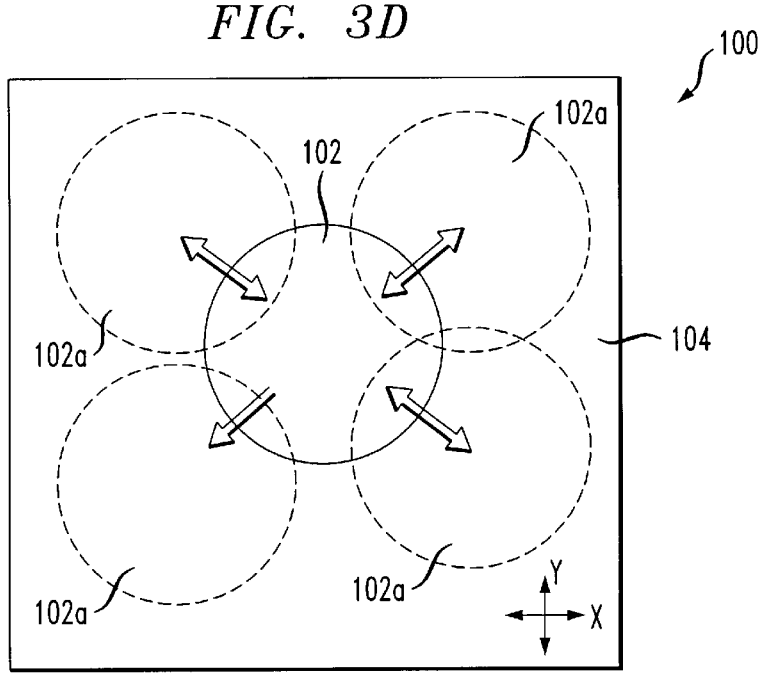

FIGS. 3C and 3D illustrate that the lateral positioning of the droplet 102 can also be changed relative to the initial location of the droplet 102 along a first surface of the photoresponsive layer 104 by selectively irradiating the photoresponsive layer 104 with light 108a. In FIG. 3C, light 108a is concentrated towards a first area of the photoresponsive layer 104 that overlaps and contacts a first lateral edge of the droplet 102. This first lateral edge is shown generally at 110. The light 108a, which increases the surface energy of the photoresponsive layer 104 along the irradiated area, causes the the droplet 102 to move towards the irradiated photoresponsive area. In essence the droplet moves towards light 108a until it is aligned with light 108a. If hysteresis impedes the movement of the droplet 102 or if the movement of the droplet is to be accelerated, a second light source (not shown) may be utilized in conjunction with the first light source. The second light source concentrates light (not shown) toward a second lateral edge opposite the first lateral edge 110 of the droplet 102 and indicated generally at 112. The second light source produces light having a wavelength that causes the surface energy of the photoresponsive layer 104 proximate to this second lateral edge to decrease. The photoresponsive layer 104 is alternatingly irradiated by these light sources, i.e, the light sources are oppositely switched on and off. FIG. 3D is a top plan view of the microlens 100 illustrating that the droplet 102 may be repositioned along the X-Y axes of the photoresponsive layer 104, as shown by way of example by the directional arrows and shadow droplets 102a. Once the droplet 102 is repositioned along the photoresponsive layer 104, a light source—not necessarily a light source different than the one or more used to cause droplet 102 to move—may then be used to irradiate the photoresponsive layer as described above in order to change the contact angle $\theta$.

One exemplary feature of the photo-tunable microlens 100 is that the microlens is self-aligning. As shown in FIG. 3C, the droplet 102 aligns itself with light 108. This feature allows a microlens to self-align itself with, for example, a light beam encoded with data, assuming of course that the light beam has an appropriate wavelength for interacting with the photoresponsive layer 104.

It should be apparent from the above examples that at least a portion of the photoresponsive layer 104 that contacts droplet 102 can be selectively irradiated by one or more light sources in order to selectively and/or locally change the surface energy of the photoresponsive layer 104 in any number of combinations in order to adjust the contact angle θ and, thereby, to modify the focal length of the microlens 100. Likewise, at least a portion of the photoresponsive layer 104 that contacts droplet 102 can be selectively irradiated by one or more light sources in order to selectively and/or locally change the surface energy of the photoresponsive layer 104 in any number of combinations in order to reposition the droplet 102 relative to an initial location of the droplet 102 on the photoresponsive layer 104, whereby the lateral position of the focal spot of the microlens 100 is adjusted. Therefore, the microlens 100 allows for the adjustment of the focal spot in three dimensions—the position of the focal spot as determined by the focal length and the X-Y lateral position of the focal spot in the focal plane that is parallel with the microlens and is a focal length away from the microlens.

Although light 108 and 108a are shown originating from a light source that is disposed below the supporting layer 106 and photoresponsive layer 104 (as indicated by the directional arrows representing light 108), this need not be the case. The light source may be positioned above the photoresponsive layer 104 (such as in the case of a data carrying signal) or at an angle with the photoresponsive layer 104 as long as the photoresponsive layer 104 is irradiated in the desired location. Further, the light source may be a monochromatic light source, meaning the provided light includes wavelengths within a relatively narrow range. The light source may include one or more lasers. Light characterized by a gradient of intensity (as shown in FIG. 1B) may also be utilized, for example, in order to reposition the droplet 102 as described in connection with FIGS. 3C and 3D. This gradient of intensity may be achieved by passing a uniformly intense light signal through an appropriate filter.

The liquid droplet 102 may be any liquid that is transparent to the wavelength of the tuning light signal, when the light source for the tuning light signal is disposed to transmit the tuning light signal at least partially through the droplet 102, and that is transparent to the optical signal to be focused and/or redirected by the microlens 100. With respect to the supporting layer 106, the layer need only be transparent to the tuned light source (i.e., that light focused or redirected by a microlens 100) and the tuning light source if that light source is propagated from below the layer 106 to the photoresponsive layer 104.

In one embodiment, the liquid droplet 102 of the microlens may be substantially encompassed by a liquid that is immiscible with the droplet. The surrounding liquid may help to prevent the microlens droplet from evaporating. When the droplet is water based, various oils or high molecular weight alcohols (e.g., pentanol, octanol, etc.) may be utilized. The surrounding liquid must be appropriately transparent. Also, the surrounding for a photo-tunable liquid microlens is not restricted to liquids that are insoluble to salts because there is no need for the droplet 102 to be conductive, e.g., such as through an aqueous solution of a salt.

From the above, it should be apparent that the described microlens may be designed to have a desired contact angle θ when the photoresponsive layer is not irradiated with a light source that causes its surface energy to change and may be designed to have a desired contact angle hysteresis. This may be achieved by selecting appropriate materials, dimensions, and volumes as guided by the equations set forth above as well as by utilizing appropriate deposition techniques for the photoresponsive layer 104. The microlens, therefore, allows for substantial freedom in both droplet curvature and position control, thereby leading to a wide range of tunability in the microlens, focal length, focal spot position, and numerical aperture.

Figure 4:
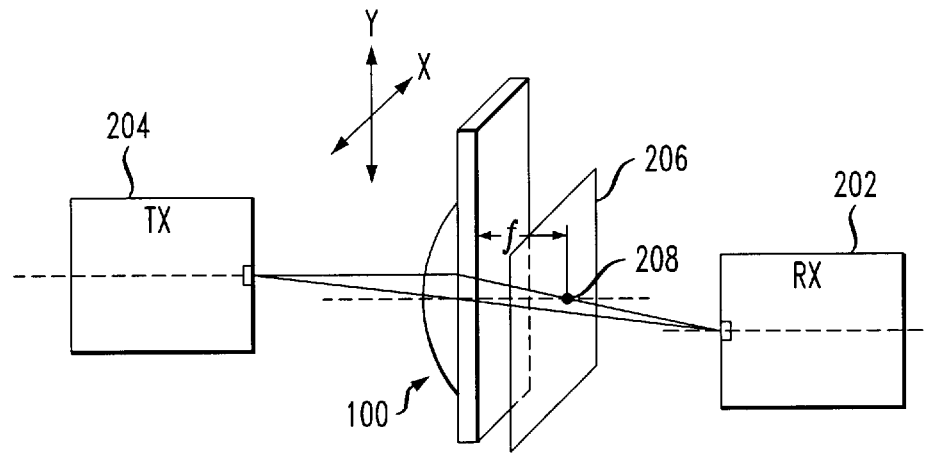
FIG. 4 illustrates an optical system including a tunable liquid microlens of the present invention.

One of ordinary skill should realize that the microlens of the present invention may be utilized in several optoelectronic applications. For example, the microlens may be used to achieve optimal coupling between an optical signal transmitter 204, such as a laser, and an optical signal receiver 202, such as a photodetector. This is illustrated in FIG. 4. It should be understood from FIG. 4 that the optical signal from transmitter 204 is diverging and will be focused behind the focal plane 206. The lens focal distance and lateral positioning of the focal spot 208 within focal plane 206 of the microlens 100 may be adjusted as described above by selectively irradiating the photoresponsive layer 104 of the microlens 100 to achieve this optimal coupling. The photoresponsive layer may be selectively irradiated until a peak power is detected at receiver 202—representing the optimal coupling between transmitter 204 and receiver 202. Currently, optoelectronic packages, i.e., physical apparatuses incorporating optoelectronic components such as lasers and/or photodetectors, are calibrated by physically moving component parts to achieve optimal coupling. This process can be slow and quite expensive. By including at least one microlens of the present invention in the apparatus, the need to physically align component parts to achieve optimal coupling is eliminated. Rather, the focal length and lateral position of the focal spot of the microlens of the present invention may be adjusted to redirect an optical signal from a transmitter to a fixed receiver. It should be understood that the tunable microlens may form a part of an apparatus that includes both a transmitting component and a receiving component and the tunable microlens may be positioned and tuned to redirect an optical signal from the transmitting component to the receiving component. Alternatively, the microlens may form a part of a transmitting apparatus, i.e., as part of the transmitter, or the microlens may form a part of the receiving apparatus, i.e., as part of the receiver.

Figure 5:
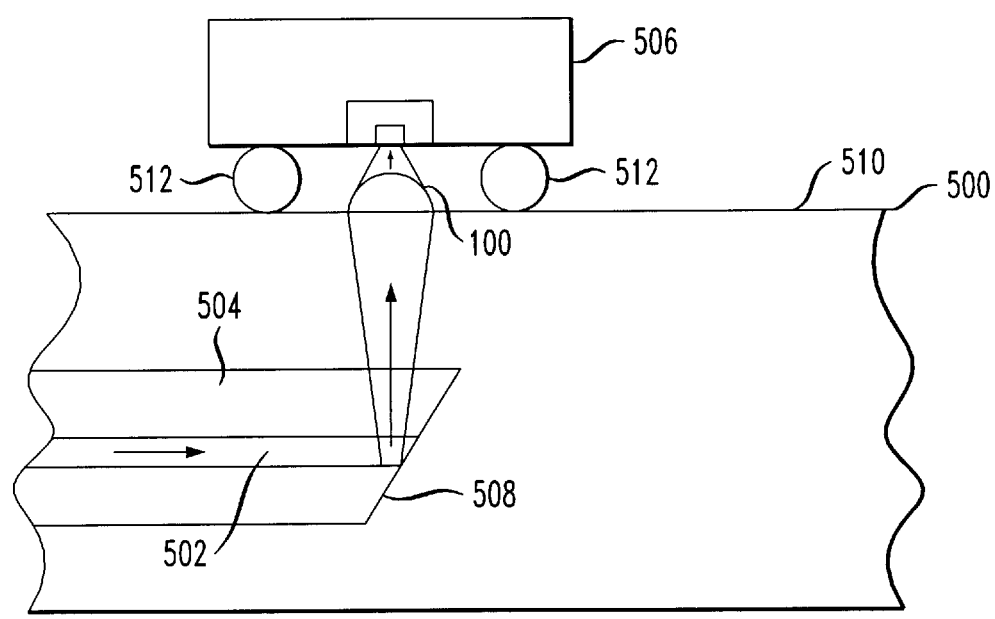
FIG. 5 is a diagram of an apparatus including a planar waveguide and a tunable liquid microlens of the present invention.

In one exemplary application illustrated in FIG. 5, a microlens 100, or plurality of microlenses of the present invention, is utilized to couple an optoelectronic component, such as a photodetector 506 that is surface-mounted through a ball grid array 512 on a printed circuit board 500, with an embedded planar waveguide 504. Light propagates through a core 502 of planar waveguide 504 as indicated by the directional arrows. The light is reflected by a mirror edge 508 toward a top surface 510 of the printed circuit board 500. A tunable liquid microlens 100 is disposed on the top surface 510 of the printed circuit board 500 and directs the light 502 toward photodetector 506 in the direction shown. The photoresponsive layer 104 may be selectively irradiated by a light source (not shown) to adjust the focal length and lateral focal spot position of the microlens 100 in order to tune the microlens 100 to optimize the transmission of the light from the planar waveguide 504 to the photodetector 506. The shape of the microlens is maintained by the application of the appropriate light. Further, the microlens 100 is capable of self-aligning with light exiting a planar waveguide if desired.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. An apparatus, comprising a tunable liquid microlens, said tunable liquid microlens comprising:
    a transparent supporting layer;
    a transparent photoresponsive layer disposed on a first surface of said supporting layer; and
    a droplet of a transparent liquid disposed on said photoresponsive layer, said photoresponsive layer separating said supporting layer and said droplet,
    wherein at least a portion of said photoresponsive layer contacting said droplet may be selectively irradiated by at least one light source such that a contact angle between said droplet and said photoresponsive layer may be varied and said droplet may be repositioned along said photoresponsive layer,
    whereby at least one of a focal length and a lateral position of a focal spot of said microlens may be adjusted.

2. The apparatus of claim 1, wherein said photoresponsive layer includes a film or a monolayer that is capable of changing its surface energy in response to irradiation by light.

3. The apparatus of claim 1, wherein said supporting layer comprises glass.

4. The apparatus of claim 1, wherein said droplet is substantially encompassed by a liquid that is immiscible with said droplet, said liquid protecting said droplet from evaporation.

5. The apparatus of claim 1, further comprising said at least one light source.

6. The apparatus of claim 5, wherein said at least one light source includes at least one monochromatic light source.

7. The apparatus of claim 5, wherein said at least one light source irradiates said portion of said photoresponsive layer with a light signal encoded with data.

8. The apparatus of claim 5, wherein said at least one light source includes a first and a second light sources, said first light source providing light having a first wavelength and said second light source providing light having a second wavelength.

9. The apparatus of claim 1, further comprising a transmitter, said transmitter providing an optical signal to said tunable liquid microlens, whereby said at least one of said focal length and said lateral position of said focal spot of said microlens are adjustable to direct said optical signal from said transmitter to a receiver in a prescribed manner.

10. The apparatus of claim 9, wherein said tunable liquid microlens is included within said transmitter.

11. The apparatus of claim 1, further comprising a receiver, whereby said at least one of said focal length and said lateral position of said focal spot of said microlens are adjustable to direct an optical signal from a transmitter to said receiver in a prescribed manner.

12. The apparatus of claim 11, further comprising said transmitter, said transmitter providing said optical signal.

13. The apparatus of claim 11, wherein said tunable liquid microlens is included within said receiver.

14. A method of tuning a liquid microlens, said liquid microlens including a transparent supporting layer, a transparent photoresponsive layer disposed on a first surface of said supporting layer, and a droplet of a transparent liquid disposed on said photoresponsive layer, said photoresponsive layer separating said supporting layer and said droplet, said method comprising the step of:
    selectively irradiating at least a portion of said photoresponsive layer contacting said droplet with at least one light source to vary an interfacial surface tension between said droplet and said portion of said photoresponsive layer such that a contact angle between said droplet and said photoresponsive layer may be varied and said droplet may be repositioned along said photoresponsive layer.

15. The method of claim 14, wherein the step of selectively irradiating includes the step of selectively irradiating said portion to reposition said droplet along said photoresponsive layer, whereby a lateral position of a focal spot of said microlens is adjusted.

16. The method of claim 15, wherein the step of selectively irradiating includes the step of substantially concentrating a first irradiating light signal having a first wavelength towards a first area of said photoresponsive layer, said first area overlapping and contacting a first lateral edge of said droplet, said first lateral edge being included substantially within a first half of said droplet.

17. The method of claim 16, wherein the step of selectively irradiating further includes the step of substantially concentrating a second irradiating light signal having a second wavelength towards a second area of said photoresponsive layer, said second area overlapping and contacting a second lateral edge of said droplet, said second lateral edge being included substantially within a second half of said droplet.

18. The method of claim 17, wherein the step of selectively irradiating includes the step of alternatingly irradiating said first and second areas with said first and-said second irradiating light signals, respectively.

19. The method of claim 14, wherein the step of selectively irradiating includes the step of selectively irradiating said portion to vary a contact angle between said droplet and said photoresponsive layer, whereby a focal length of said microlens is adjusted.

20. The method of claim 19, wherein the step of selectively irradiating said portion to vary a contact angle between said droplet and said photoresponsive layer includes the step of irradiating an area of said photoresponsive layer that is larger than and includes any area of said photoresponsive layer that contacts said droplet.

21. The method of claim 14, wherein the step of selectively irradiating includes the step of selectively irradiating said portion to reposition said droplet along said photoresponsive layer, whereby a lateral position of a focal spot of said microlens is adjusted, and to vary a contact angle between said droplet and said photoresponsive layer, whereby a focal length of said microlens is adjusted.

22. The method of claim 14, wherein the step of selectively irradiating includes the step of irradiating said portion to align said droplet with said light source and then irradiating said portion to vary a contact angle between said droplet and said photoresponsive layer.

23. A method of transmitting an optical signal, comprising the steps of:
    directing said optical signal from a first location towards a liquid microlens, said liquid microlens including a transparent supporting layer, a transparent photoresponsive layer disposed on a first surface of said supporting layer, and a droplet of a transparent liquid disposed on said photoresponsive layer, said photoresponsive layer separating said supporting layer and said droplet; and tuning said liquid microlens to optically process in a prescribed manner said optical signal, said tuning step comprising the step of:

selectively irradiating at least a portion of said photoresponsive layer contacting said droplet with at least one light source to vary an interfacial surface tension between said droplet and said portion of said photoresponsive layer such that a contact angle between said droplet and said photoresponsive layer may be varied and said droplet may be repositioned along said photoresponsive layer, whereby at least one of a focal length and a lateral position of a focal spot of said microlens are adjustable in tuning said liquid microlens.

24. The method of claim 23, wherein the step of selectively irradiating includes the step of selectively irradiating said portion to reposition said droplet along said photoresponsive layer, whereby a lateral position of a focal spot of said microlens is adjusted.

25. The method of claim 24, wherein the step of selectively irradiating includes the step of substantially concentrating a first irradiating light signal having a first wavelength towards a first area of said photoresponsive layer, said first area overlapping and contacting a first lateral edge of said droplet, said first lateral edge being included substantially within a first half of said droplet.

26. The method of claim 25, wherein the step of selectively irradiating further includes the step of substantially concentrating a second irradiating light signal having a second wavelength towards a second area of said photoresponsive layer, said second area overlapping and contacting a second lateral edge of said droplet, said second lateral edge being included substantially within a second half of said droplet.

27. The method of claim 26, wherein the step of selectively irradiating includes the step of alternatingly irradiating said first and second areas with said first and said second irradiating light signals, respectively.

28. The method of claim 23, wherein the step of selectively irradiating includes the step of selectively irradiating said portion to vary a contact angle between said droplet and said photoresponsive layer, whereby a focal length of said microlens is adjusted.

29. The method of claim 28, wherein the step of selectively irradiating said portion to vary a contact angle between said droplet and said photoresponsive layer includes the step of irradiating an area of said photoresponsive layer that is larger than and includes any area of said photoresponsive layer that contacts said droplet.

30. The method of claim 23, wherein the step of selectively irradiating includes the step of selectively irradiating said portion to reposition said droplet along said photoresponsive layer, whereby a lateral position of a focal spot of said microlens is adjusted, and to vary a contact angle between said droplet and said photoresponsive layer, whereby a focal length of said microlens is adjusted.

31. The method of claim 23, wherein the step of selectively irradiating includes the step of irradiating said portion to align said droplet with said light source and then irradiating said portion to vary a contact angle between said droplet and said photoresponsive layer.

32. An apparatus comprising a tunable liquid microlens, said tunable liquid microlens comprising:

transparent supporting means;

transparent photoresponsive means disposed on a first surface of said supporting means; and a droplet of transparent liquid disposed on said photoresponsive means, said photoresponsive means separating said supporting means and said droplet, wherein at least a portion of said photoresponsive means may be selectively irradiated such that at least one of a focal length and a lateral position of a focal spot of said microlens are adjustable.

33. The apparatus of claim 32, further comprising irradiating means for selectively irradiating said portion of said photoresponsive means to adjust said focal length and lateral position of said focal spot.

* * * * *